(12) United States Patent
Suzuki et al.

(10) Patent No.: US 10,428,962 B2
(45) Date of Patent: Oct. 1, 2019

(54) VALVE DEVICE

(71) Applicants: JTEKT CORPORATION, Osaka-shi, Osaka (JP); Toyota Jidosha Kabushiki Kaisha, Toyota-shi, Aichi-ken (JP)

(72) Inventors: Takuya Suzuki, Anjo (JP); Kazuki Okamura, Okazaki (JP); Yuya Kihara, Nishio (JP); Akio Nakamura, Okazaki (JP); Shusuke Inagi, Toyota (JP); Akira Yamashita, Toyota (JP); Koji Kida, Toyota (JP)

(73) Assignees: JTEKT CORPORATION, Osaka-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

(21) Appl. No.: 15/791,959

(22) Filed: Oct. 24, 2017

(65) Prior Publication Data
US 2018/0119831 A1 May 3, 2018

(30) Foreign Application Priority Data
Oct. 31, 2016 (JP) .................. 2016-213056

(51) Int. Cl.
*F16K 15/02* (2006.01)
*F16K 1/30* (2006.01)
*F16K 15/06* (2006.01)

(52) U.S. Cl.
CPC ............ *F16K 15/026* (2013.01); *F16K 1/301* (2013.01); *F16K 15/063* (2013.01)

(58) Field of Classification Search
CPC ...... F16K 15/026; F16K 1/301; F16K 15/063; Y10T 137/7925
See application file for complete search history.

(56) References Cited

U.S. PATENT DOCUMENTS

| | | | | |
|---|---|---|---|---|
| 2,912,001 A | * | 11/1959 | Green .................. | F16K 15/063 137/516.29 |
| 2,918,083 A | * | 12/1959 | Clark, Jr. .............. | F16K 15/026 137/515.5 |

(Continued)

FOREIGN PATENT DOCUMENTS

| | | |
|---|---|---|
| EP | 1154177 A2 | 11/2001 |
| EP | 2591255 B1 | 3/2016 |

(Continued)

OTHER PUBLICATIONS

Mar. 23, 2018 Extended Search Report issued in European Patent Application No. 17198501.3.

*Primary Examiner* — Marina A Tietjen
*Assistant Examiner* — Frederick D Soski
(74) *Attorney, Agent, or Firm* — Oliff PLC (57) ABSTRACT

A valve device for a gas tank, includes a body and a check valve provided in an injection passage to inject gas into the gas tank. The check valve includes a valve seat, a case fixed in the injection passage while a space is provided between an inner peripheral surface of the injection passage and the case to enable gas to flow through the space, and a valve element accommodated in the case. The case includes a cylindrical portion, and is configured such that the bottom of the cylindrical portion, provided at an opposite side to the valve seat, defines a range where the valve element is axially movable. The valve element includes a head portion that can block a valve hole of the valve seat, and a sliding portion formed to be axially movable with respect to the cylindrical portion.

9 Claims, 5 Drawing Sheets

(56) References Cited

U.S. PATENT DOCUMENTS

| | | | |
|---|---|---|---|
| 3,356,103 A | 12/1967 | Biello et al. | |
| 4,271,862 A * | 6/1981 | Snoek | F16K 1/34 137/511 |
| 5,893,389 A * | 4/1999 | Cunningham | F16K 15/063 137/516.27 |
| 5,921,276 A * | 7/1999 | Lam | F16K 15/026 137/220 |
| 2001/0054442 A1 | 12/2001 | Voss | |
| 2004/0074539 A1* | 4/2004 | Weis | E03C 1/104 137/543 |
| 2006/0021661 A1* | 2/2006 | Koch | F16K 15/026 137/543.19 |
| 2009/0250123 A1* | 10/2009 | Matsubara | F16K 15/063 137/528 |
| 2010/0024891 A1* | 2/2010 | Francini | F16K 15/026 137/14 |
| 2010/0025601 A1* | 2/2010 | Francini | F04B 39/1013 251/63.6 |
| 2010/0288961 A1* | 11/2010 | Weh | F16K 15/026 251/367 |
| 2012/0057964 A1* | 3/2012 | Yang | F16K 1/126 415/119 |
| 2012/0060943 A1* | 3/2012 | Huang | F16K 15/063 137/514 |
| 2013/0019745 A1* | 1/2013 | Bagagli | F04B 39/1013 91/418 |
| 2013/0099486 A1 | 4/2013 | Weh et al. | |
| 2014/0053913 A1 | 2/2014 | Dickey | |
| 2015/0211500 A1 | 7/2015 | Kumazawa et al. | |
| 2016/0102771 A1 | 4/2016 | Kuroyanagi et al. | |

FOREIGN PATENT DOCUMENTS

| | | |
|---|---|---|
| JP | 2011-069235 A | 4/2011 |
| JP | 2015-140782 A | 8/2015 |
| JP | 2016-075373 A | 5/2016 |
| WO | 2012/003927 A1 | 1/2012 |

\* cited by examiner

VALVE DEVICE

INCORPORATION BY REFERENCE

The disclosure of Japanese Patent Application No. 2016-213056 filed on Oct. 31, 2016 including the specification, drawings and abstract is incorporated herein by reference in its entirety.

BACKGROUND

1. Technical Field

The present disclosure relates to a valve device.

2. Description of Related Art

A gas tank mounted in a fuel-cell vehicle or the like is provided with a valve device that controls supply and exhaust of hydrogen gas under high pressure stored the gas tank. This kind of valve device includes a body provided with a gas flow channel that communicates between the inside and outside of the gas tank. The gas flow channel includes an injection passage through which hydrogen gas is injected into the gas tank from an external supply source (a hydrogen tank in a hydrogen station, etc.), the injection passage being provided with a check valve that prevents backflow of the hydrogen gas.

Figure 10:
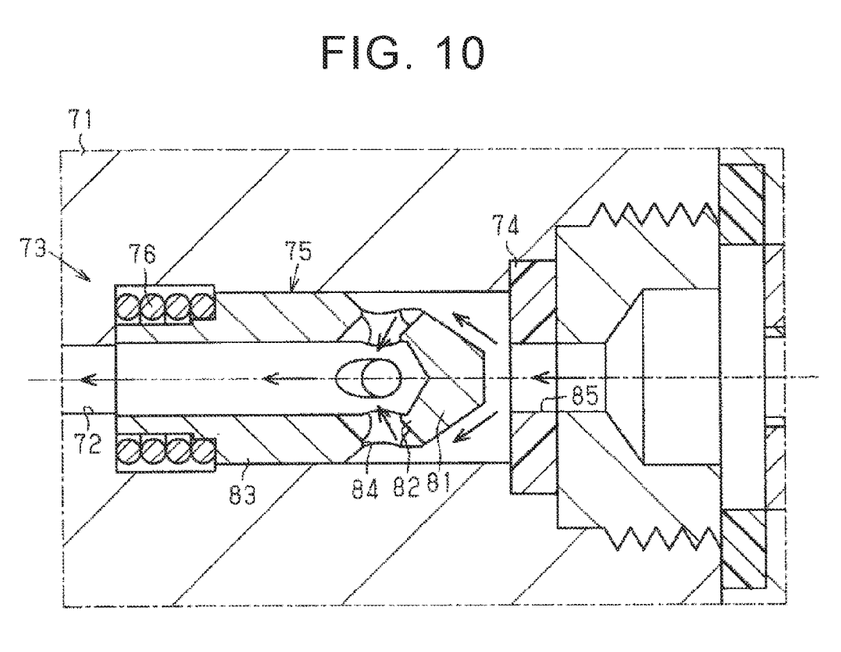
FIG. 10 is a partly-sectioned view near a conventional check valve in a valve-open state.

Specifically, a valve device described in Japanese Patent Application Publication No. 2016-75373 has a body 71 provided with an injection passage 72 having an opening with a diameter larger than that of another portion thereof to accommodate a check valve 73, as illustrated in FIG. 10, for example. The check valve 73 includes a valve seat 74 in an annular shape fixed in the injection passage 72, a valve element 75 disposed on a back side (left side in FIG. 10) of the valve seat 74 in the injection passage 72, and an urging member 76, such as a coil spring, urging the valve element 75 toward the valve seat 74. The valve element 75 includes a head portion 81, a small-diameter cylindrical portion 82, and a large-diameter cylindrical portion 83, which are provided in the order described from a valve seat 74 side (right side in FIG. 10). The small-diameter cylindrical portion 82 has an outer diameter that is set smaller than an outer diameter of the large-diameter cylindrical portion 83, and the small-diameter cylindrical portion 82 is provided with a lateral hole 84 passing therethrough radially. The outer diameter of the large-diameter cylindrical portion 83 is set slightly smaller than the inner diameter of the injection passage 72, so that the valve element 75 can be axially moved in the injection passage 72.

In this kind of valve device, when no hydrogen gas is injected, the valve element 75 is urged by pressure of hydrogen gas in the gas tank (tank internal pressure) and urging force of the urging member 76, and then the head portion 81 blocks a valve hole 85 of the valve seat 74 to cause the check valve 73 to be a valve-closed state. Meanwhile, when hydrogen gas is injected, pressure of hydrogen gas injected from the outside (injection pressure) through a coupling (not illustrated) causes the valve element 75 to be away from the valve seat 74 against the urging force of the urging member 76, thereby causing the check valve to be a valve-open state. Then, the hydrogen gas flowing into the injection passage 72 through the valve hole 85 passes through the valve element 75 through the lateral hole 84 as indicated by arrows in FIG. 10, and then flows toward a back side of the injection passage 72 to be injected into the gas tank.

SUMMARY

When the amount of hydrogen gas stored in the gas tank is low to cause tank internal pressure to be less than injection pressure, such as at the beginning of injection, the valve element 75 is firmly pushed on a movable end (a stepped face of level difference face of the injection passage 72) in a valve opening direction by differential pressure between the tank internal pressure and the injection pressure against the urging force of the urging member 76. Meanwhile, when increase in the amount of stored hydrogen gas causes the tank internal pressure to be close to the injection pressure to reduce the differential pressure, the valve element 75 comes close to the valve seat 74 by the urging force of the urging member 76. In this state, act differential pressure acting on the valve element 75 and the urging force of the urging member 76 are substantially in balance, so that the valve element 75 tends to move with relative ease in the injection passage 72. In addition, a slight clearance is provided between the valve element 75 (large-diameter cylindrical portion 83) and the injection passage 72 to enable the valve element 75 to be sled in the injection passage 72, so that vibration (chattering) may occur in the valve element 75 due to influence of a flow of hydrogen gas passing through the valve element 75.

The present disclosure provides a valve device capable of reducing vibration of a valve element thereof.

A valve device for a gas tank according to an aspect of the present disclosure includes: a body that is provided in the gas tank in which high-pressure gas is stored, and in which a gas flow channel communicating between an inside and an outside of the gas tank is provided; and a check valve provided in an injection passage in the gas flow channel, the injection passage being provided to inject gas into the gas tank. The check valve includes a valve seat fixed in the injection passage, a case in a bottomed cylindrical shape fixed in the injection passage while a space is provided between an inner peripheral surface of the injection passage and the case to enable gas to flow through the space, and a valve element accommodated in the case to be brought into contact with and to be away from the valve seat. The case includes a cylindrical portion into which the valve element is fitted to be axially movable, and is configured such that the bottom of the cylindrical portion, provided at an axial end thereof opposite to the valve seat, defines a range where the valve element is axially movable. The valve element includes a head portion that can block a valve hole of the valve seat, and a sliding portion that is formed so as to have a zone of contact with the cylindrical portion, the zone being uniform throughout the range where the sliding portion is axially movable.

According to the structure described above, gas flowing into the injection passage through the valve hole passes through the space between the case and the injection passage, and flows toward a back side of the injection passage to be injected into the gas tank, so that a flow of the gas is less likely to affect the valve element as compared with the case where gas passes through the inside of the valve element. As a result, differential pressure between tank internal pressure and injection pressure decreases, so that vibration of the valve element can be reduced even when the valve element can move with relative ease in the injection passage. In addition, the sliding portion is formed so as to have the zone of contact with the cylindrical portion, the zone being uniform throughout the range where the sliding portion is axially movable, so that the valve element and the case can be prevented from biting into each other when the valve element reciprocates unlike a case where the sliding portion projects and retracts from the cylindrical portion, for example. As a result, generation of abrasion powder can be reduced, for example.

In the aspect above, the sliding portion may be formed such that an entire outer peripheral surface of the sliding portion is brought into contact with an inner peripheral surface of the cylindrical portion. According to the structure described above, the entire outer peripheral surface of the sliding portion is brought into surface contact with the inner peripheral surface of the cylindrical portion, so that no large clearance is formed between the sliding portion and the cylindrical portion. As a result, it is possible to reduce a flow of gas toward a bottom side through a clearance between the sliding portion and the cylindrical portion, so that behavior of the valve element in the case can be stable.

In the aspect above, an outer peripheral surface of the head portion may include a tapered surface in a tapered shape tapered toward the valve seat, and the tapered surface may be formed such that an extension line of the tapered surface passes closer to the bottom of the cylindrical portion than an end edge of the cylindrical portion on a valve seat side when the valve element is positioned at a return end that is farthest away from the valve seat.

According to the structure described above, when the valve element is positioned at the return end away from the valve seat, gas is likely to stay in a clearance between the valve element and a cylindrical portion of the case. Then, pressure of gas flowing into the clearance between the valve element and the cylindrical portion of the case applies not only force pressing the valve element toward its axis (radially inward), but also force pressing the valve element toward the bottom of the case, the force acting at a position away from the axis, so that behavior of the valve element can be more stable.

In the aspect above, the outer peripheral surface of the head portion may include a tapered surface in a tapered shape tapered toward the valve seat, and the tapered surface may be formed such that an extension line of the tapered surface passes closer to the valve seat than an end edge of the cylindrical portion on a valve seat side when the valve element is positioned at a return end that is farthest away from the valve seat.

According to the structure described above, when the valve element is positioned at the return end away from the valve seat, gas flowing into the injection passage through the valve hole collides with the head portion of the valve element to flow along the tapered surface, and thus hardly collides with the inner peripheral surface of the cylindrical portion to flow into a space on an outer peripheral side of the case. This enables a flow of the gas to be smoothed, so that occurrence of a turbulent flow can be reduced, for example.

In the aspect above, the inner peripheral surface of the injection passage may be formed in a cylindrical shape, and an outer peripheral surface of the case may include a curved surface with a cross section in an arc shape having a curvature equal to that of the inner peripheral surface of the injection passage, and a flow channel surface in a noncircular shape, extending throughout an entire axial range of the case.

According to the structure described above, when the case is inserted into the injection passage, the case can be easily fixed while a clearance is formed between the inner peripheral surface of the injection passage and the flow channel surface to allow gas to flow through the clearance.

According to the present disclosure, vibration of the valve element can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
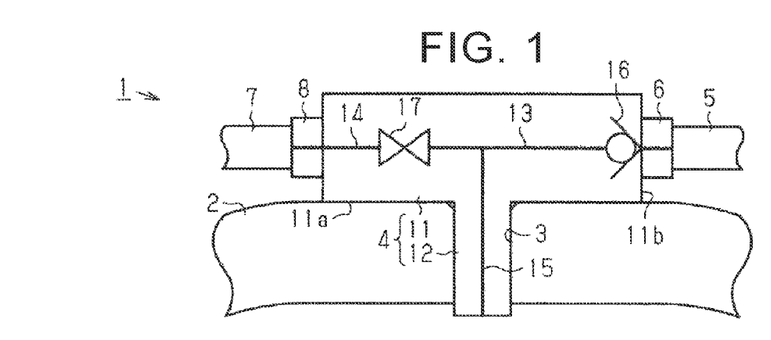
FIG. 1 is a schematic structural view of a valve device.

A first embodiment of a valve device will be described below with reference to accompanying drawings. A valve device 1 illustrated in FIG. 1 is attached into an attaching port 3 of a gas tank 2 in which hydrogen gas under high pressure (e.g., 70 MPa) is stored. The valve device 1 includes a body 4 made of an aluminum alloy, a supply-side coupling 6 configured to connect a supply pipe 5 extending from an external supply source (e.g., a hydrogen tank in a hydrogen station, etc.), and a delivery-side coupling 8 configured to connect a delivery pipe 7 extending to a delivery destination (e.g., a fuel cell, etc.). The body 4 includes a body portion 11 in the shape of a flat box, disposed outside the gas tank 2, and an attaching portion 12 to be inserted into the attaching port 3. The attaching portion 12 is formed in a columnar shape extending in a direction (downward in FIG. 1) substantially orthogonal to a bottom face 11a of the body portion 11.

The body portion 11 is provided with an injection passage 13 configured to inject hydrogen gas flowing through the supply pipe 5 into the gas tank 2, and a delivery passage 14 configured to deliver the hydrogen gas to a delivery destination through the delivery pipe 7. The attaching portion 12 is provided with a connection passage 15 that is connected to each of the injection passage 13 and the delivery passage 14, and that opens in the gas tank 2. That is, in the present embodiment, the injection passage 13, the delivery passage 14, and the connection passage 15 constitute a gas flow channel that communicates between the inside and outside of the gas tank 2. The injection passage 13 is provided with a check valve 16 that prevents hydrogen gas injected into the gas tank 2 from flowing backward to be discharged to the outside, and the delivery passage 14 is provided with an electromagnetic valve 17 that controls supply of hydrogen gas to a delivery destination. Then, in the valve device 1, the supply pipe 5 is coupled to the supply-side coupling 6 to connect the supply pipe 5 to the injection passage 13, and the delivery pipe 7 is coupled to the delivery-side coupling 8 to connect the delivery pipe 7 to the delivery passage 14.

Figure 2:
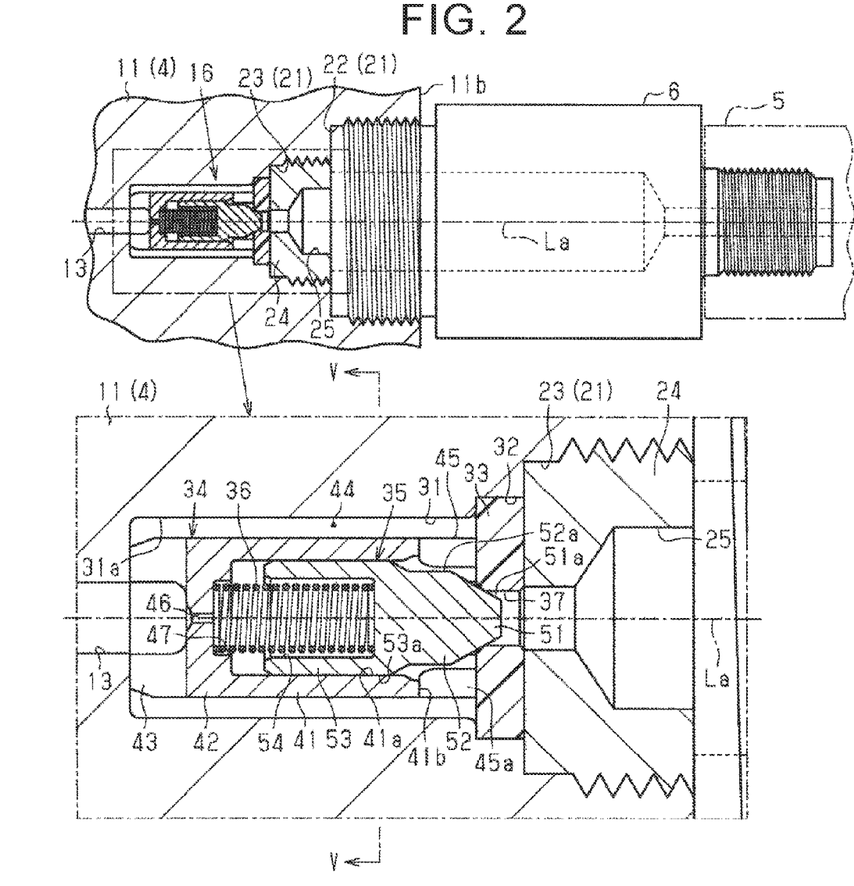
FIG. 2 is a partly-sectioned view near a check valve of a first embodiment in a valve-closed state.

As illustrated in FIG. 2, the body portion 11 has a side face 11b that is provided with an attaching hole 21 in the shape of a round hole, extending in a direction (a side-to-side direction in FIG. 2) substantially orthogonal to the side face 11b. The attaching hole 21 includes a first attaching hole 22 that opens to the side face 11b, and a second attaching hole 23 that is adjacent to a back side (left side in FIG. 2) of the first attaching hole 22. The first attaching hole 22 and the second attaching hole 23 are formed on the same axis La, and the first attaching hole 22 is formed to have an inner diameter larger than an inner diameter of the second attaching hole 23. The first and second attaching holes 22, 23 each have an inner peripheral surface provided with a female thread. Then, the supply-side coupling 6 is screwed into the first attaching hole 22, and a plug 24 in a cylindrical shape is screwed into the second attaching hole 23. In addition, a seal member (not illustrated) is interposed between a bottom face of the first attaching hole 22 and the supply-side coupling 6 to airtightly seal therebetween. The plug 24 is provided with a communicating hole 25 that axially passes through the plug 24 to communicate with the inside of the supply-side coupling 6.

The injection passage 13 is formed in the shape of a straight pipe while extending coaxially with the first and second attaching holes 22, 23, near the side face 11b of the body portion 11, and opens to a bottom face of the second attaching hole 23. Thus, the injection passage 13 is connected to the communicating hole 25 of the plug 24 screwed into the second attaching hole 23, and communicates with the inside of the supply-side coupling 6 through the communicating hole 25. Then, the check valve 16 is provided in an opening portion of the injection passage 13, on a second attaching hole 23 side.

An opening portion of the injection passage 13 on an attaching hole 21 side is set to have an inner diameter larger than that of another portion thereof to accommodate the check valve 16. Specifically, opening portions of the injection passage 13 include a first accommodation portion 31 that has an inner peripheral surface in a cylindrical shape, and a second accommodation portion 32 that extends to the first accommodation portion 31 and has an inner peripheral surface in a cylindrical shape, opening to a bottom face of the attaching hole 21 (second attaching hole 23), in order from a back side of the injection passage 13. The first and second accommodation portions 31, 32 increase in inner diameter in the order described, and are formed so as to be disposed on the same axis La as that of each of the attaching hole 21 and the injection passage 13.

The check valve 16 includes a valve seat 33, a case 34, a valve element (poppet) 35, an urging member 36 such as a coil spring. The valve seat 33 is formed of an elastic material such as polyimide resin. The valve seat 33 is formed in an annular shape having a valve hole 37. The valve seat 33 is fitted into the second accommodation portion 32, and is fixed in the injection passage 13 by being sandwiched between the plug 24 screwed into the second attaching hole 23 and a bottom face of the second accommodation portion 32. The valve hole 37 is formed so as to be disposed on the axis La when the valve seat 33 is fitted into the second accommodation portion 32.

As illustrated in FIGS. 2 to 5, the case 34 is formed in a bottomed cylindrical shape. The case 34 includes a cylindrical portion 41, a bottom 42 of the cylindrical portion 41, and a plurality of leg portions 43, which are provided in the order described from a valve seat 33 side (right side in FIG. 2). The case 34 has an axial length that is set to be substantially equal to an axial length of the first accommodation portion 31. This causes an opening end of the cylindrical portion 41 to be brought into contact with the valve seat 33, and a leading end of each of the leg portions 43 to be brought into contact with a bottom face of the first accommodation portion 31.

An outer peripheral surface of the case 34 is formed in a flat shape formed by cutting out a part of a cylinder, and includes a plurality of (four each in the present embodiment) curved surfaces 34a each with a cross section in an arc shape having a curvature equal to that of an inner peripheral surface 31a of the first accommodation portion 31 (injection passage 13), and flow channel surfaces 34b each in a plane shape, which are provided at equal angular intervals. Each of the curved surfaces 34a and each of the flow channel surfaces 34b are formed throughout an entire axial range of the cylindrical portion 41. As described above, each of the curved surfaces 34a has a curvature substantially equal to that of the inner peripheral surface of the injection passage 13, so that the case 34 is fixed in the injection passage 13 when being inserted into the injection passage 13, and then a space 44 is formed between the flow channel surface 34b and the inner peripheral surface 31a to allow hydrogen gas to flow through the space 44. Meanwhile, an inner peripheral surface 41a of the cylindrical portion 41 is formed in a cylindrical shape. In addition, the cylindrical portion 41 is provided with a lateral hole forming portion 45 including a plurality of lateral holes 45a each in a substantially U-shape formed by cutting out the flow channel surface 34b from an end face acquired when the cylindrical portion 41 virtually extends. The bottom 42 of the cylindrical portion 41 is provided at its center with a through-hole 46 axially extending, and a placing hole 47 configured to place the urging member 36 is formed in an inner bottom face of the bottom 42, coaxially with the through-hole 46. Each of the leg portions 43 is formed in the shape of a substantially triangle pole, and is provided at the corresponding one of corners (four corners) in an outer bottom face of the bottom 42.

The valve element 35 is slidably accommodated in the case 34. The valve element 35 includes a head portion 51, a shaft portion 52, and a sliding portion 53, which are provided in the order described from a valve seat 33 side. The head portion 51 is formed in a tapered shape inclining at a predetermined angle to be tapered toward the valve seat 33, and an entire outer peripheral surface of the head portion 51 forms a tapered surface 51a. The head portion 51 is formed to have a largest portion with an outer diameter that is smaller than an inner diameter of the cylindrical portion 41 and is larger than an inner diameter of the valve hole 37, and the head portion 51 is formed to have a smallest portion with an outer diameter that is smaller than the inner diameter of the valve hole 37. Then, the valve element 35 causes the check valve 16 to be a valve-closed state when being seated on the valve seat 33 to block the valve hole 37 with the head portion 51, and causes the check valve 16 to be a valve-open state when being away from the valve seat 33 to open the valve hole 37. As described above, the valve element 35 is configured to be axially movable between a forward end at which the head portion 51 is seated on the valve seat 33, and a return end at which the sliding portion 53 is brought into contact with the bottom 42 of the case 34. That is, the bottom 42 is provided at an axial end of the cylindrical portion 41, opposite to the valve seat 33, to define an axially movable range (return end) of the valve element 35.

The shaft portion 52 is formed in a columnar shape having an outer diameter substantially equal to the outer diameter of the largest portion of the head portion 51. In addition, the shaft portion 52 is provided at its end on a sliding portion 53 side with a portion increased in diameter in a tapered manner. The sliding portion 53 is formed in a columnar shape, and includes a placing hole 54 opening to a bottom 42 side of the case 34. The sliding portion 53 has an outer diameter that is set to be larger than the outer diameter of the shaft portion 52, and to be substantially equal to the inner diameter of the cylindrical portion 41. This causes the outer peripheral surface 53a of the sliding portion 53 to be brought into surface contact with the inner peripheral surface 41a of the cylindrical portion 41 to form an annular clearance between the outer peripheral surface 52a of the shaft portion 52 and the inner peripheral surface 41a of the cylindrical portion 41. That is, substantially all of the outer peripheral surface 53a of the sliding portion 53 is a zone of contact with the cylindrical portion 41 in the present embodiment.

Figure 6:
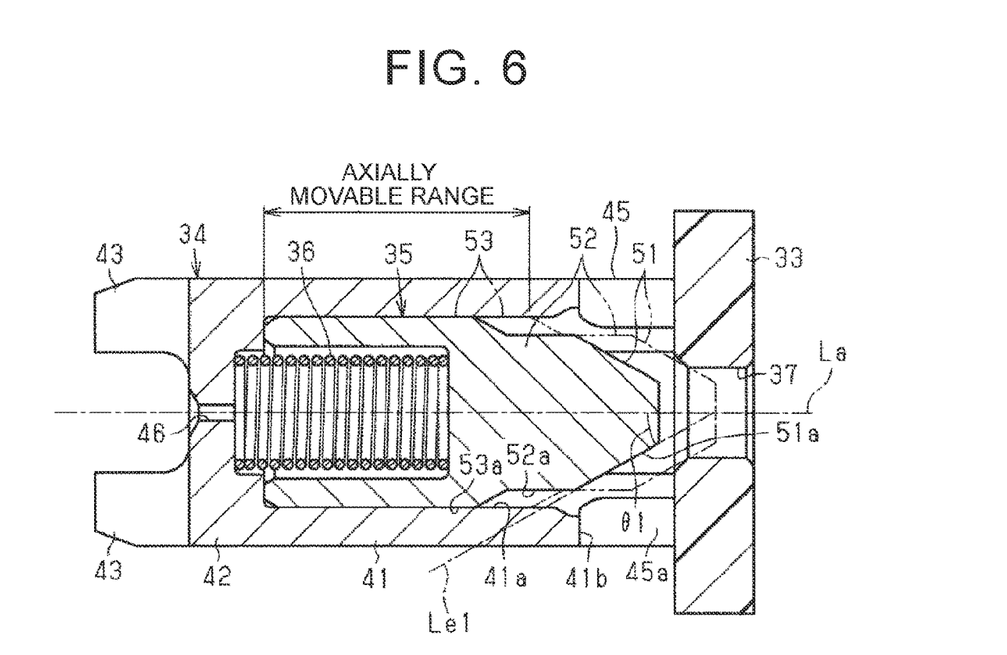
FIG. 6 is a schematic view showing a dimensional relationship between the case and a valve element of the first embodiment.

As illustrated in FIG. 6, an axial length of the sliding portion 53 is set such that a zone of contact with the cylindrical portion 41 is uniform (invariable) throughout a range (between a forward end and a return end) where the sliding portion 53 is axially movable. In other words, the axial length of the cylindrical portion 41 is set not less than a length acquired by adding an axial distance (stroke) in which the valve element 35 can be reciprocated to an axial length of the sliding portion 53. In addition, an inclination angle $\theta 1$ of the tapered surface 51a from the axis La is set such that an extension line Le1 of the tapered surface 51a passes through a position closer to the bottom 42 than an end edge 41b of the cylindrical portion 41 on a valve seat 33 side while the sliding portion 53 is in contact with bottom 42, or while the valve element 35 is positioned at a return end farthest away from the valve seat 33.

Figure 3:
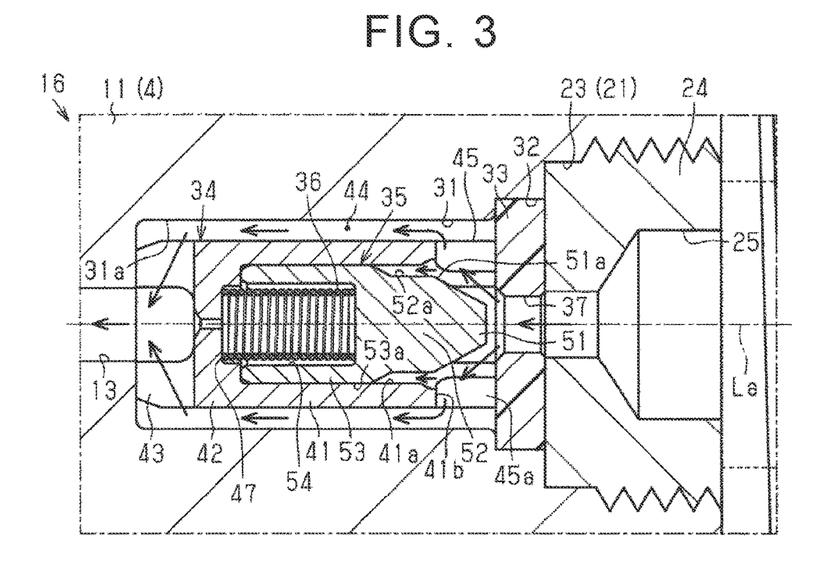
FIG. 3 is a partly-sectioned view near the check valve of the first embodiment in a valve-open state.
Figure 4:
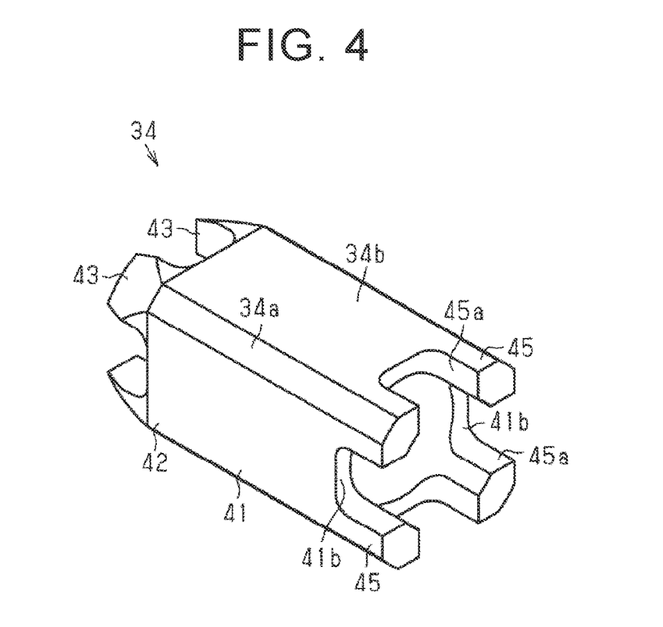
FIG. 4 is a perspective view of a case of the first embodiment.
Figure 5:
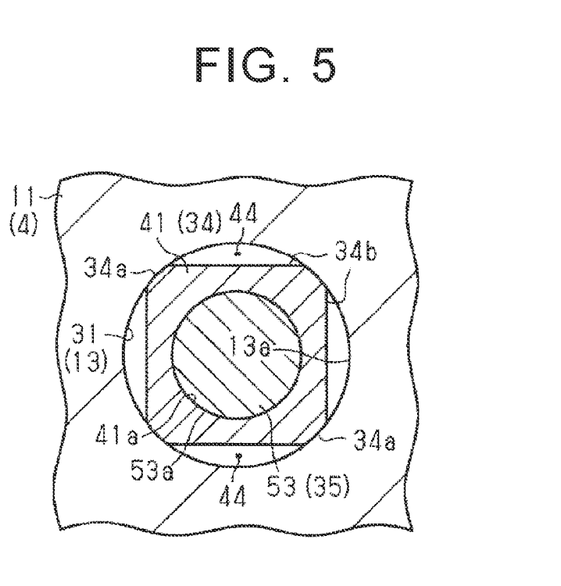
FIG. 5 is a sectional view (sectional view taken along line V-V of FIG. 2) of the check valve of the first embodiment.

The urging member 36 is inserted into the placing holes 47, 54 while being axially compressed from its free length. This causes the valve element 35 to be urged toward the valve seat 33 by the urging member 36. As illustrated in FIG. 2, in the valve device 1 configured as described above, the valve element 35 is urged by pressure of hydrogen gas in the gas tank 2 (tank internal pressure) and urging force of the urging member 36 when no hydrogen gas is injected into the gas tank 2, and then the head portion 51 blocks the valve hole 37 of the valve seat 33 (valve-closed state). Meanwhile, as illustrated in FIG. 3, the valve element 35 is away from the valve seat 33 (valve-open state) by using pressure (injection pressure) of hydrogen gas injected from the outside through a coupling (not illustrated) when hydrogen gas is injected. Then, the hydrogen gas flowing into the injection passage 13 through the valve hole 37 passes through the space 44 between the case 34 and the inner peripheral surface of the injection passage 13 through the lateral hole 45a, and flows to a back side of the injection passage 13 through each of the leg portions 43 to be injected into the gas tank 2.

As described above, the present embodiment enables the following operation effects to be achieved.

(1) Hydrogen gas flowing into the injection passage 13 through the valve hole 37 passes through the space 44 between the case 34 and the injection passage 13 through the lateral hole 45a, and then flows to the back side of the injection passage 13 to be injected into the gas tank 2, so that a flow of the hydrogen gas is less likely to affect the valve element 35 as compared with the case where the hydrogen gas passes through the inside of the valve element 35. As a result, differential pressure between the tank internal pressure and the injection pressure decreases to cause differential pressure acting on the valve element 35 and urging force of the urging member 36 to be substantially in balance, so that vibration of the valve element 35 can be reduced even when the valve element 35 can move with relative ease in the injection passage 13. In addition, the sliding portion 53 is formed so as to have a zone of contact with the cylindrical portion 41, the zone being uniform (invariable) throughout a range where the sliding portion 53 is axially movable, so that the valve element 35 and the case 34 can be prevented from biting into each other when the valve element 35 reciprocates unlike a case where the sliding portion 53 projects and retracts from the cylindrical portion 41, for example. As a result, generation of abrasion powder can be reduced, for example.

(2) The entire outer peripheral surface 53a of the sliding portion 53 is brought into surface contact with the inner peripheral surface 41a of the cylindrical portion 41, so that no large clearance is formed between the sliding portion 53 and the cylindrical portion 41. As a result, it is possible to reduce a flow of hydrogen gas toward the bottom 42 of the case 34 through a clearance between the sliding portion 53 and the cylindrical portion 41, so that behavior of the valve element 35 in the case 34 can be stable.

(3) The tapered surface 51a of the head portion 51 is formed such that the extension line Le1 of the tapered surface 51a passes closer to the bottom 42 of the cylindrical portion 41 than the end edge 41b of the cylindrical portion 41 on a valve seat 33 side when the valve element 35 is positioned farthest away from the valve seat 33. Thus, some of hydrogen gas colliding with the head portion 51 is likely to stay in the annular clearance between the cylindrical portion 41 and the shaft portion 52, as illustrated in FIG. 3. As a result, pressure of the hydrogen gas flowing into the annular clearance applies not only force pressing the valve element 35 toward its axis (radially inward), but also force pressing the valve element 35 toward the bottom 42, the force acting at a position away from the axis (an outer peripheral edge of the valve element 35), so that behavior of the valve element 35 can be more stable.

Second Embodiment

Next, a second embodiment of a valve device will be described with reference to accompanying drawings. For convenience of explanation, the same component is designated by the same reference sign as that of the first embodiment described above to eliminate duplicated description.

Figure 7:
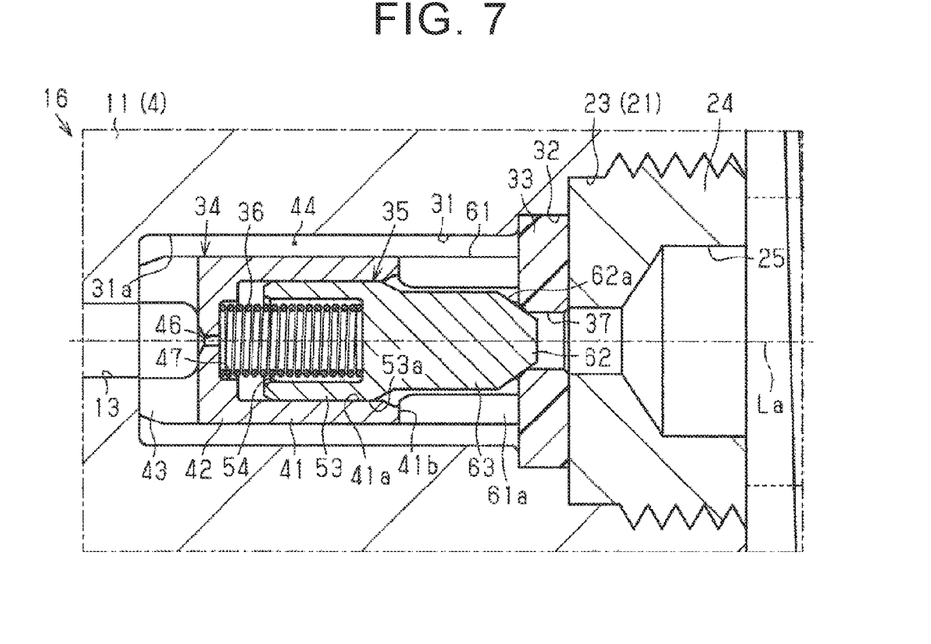
FIG. 7 is a partly-sectioned view near a check valve of a second embodiment in a valve-closed state.
Figure 8:
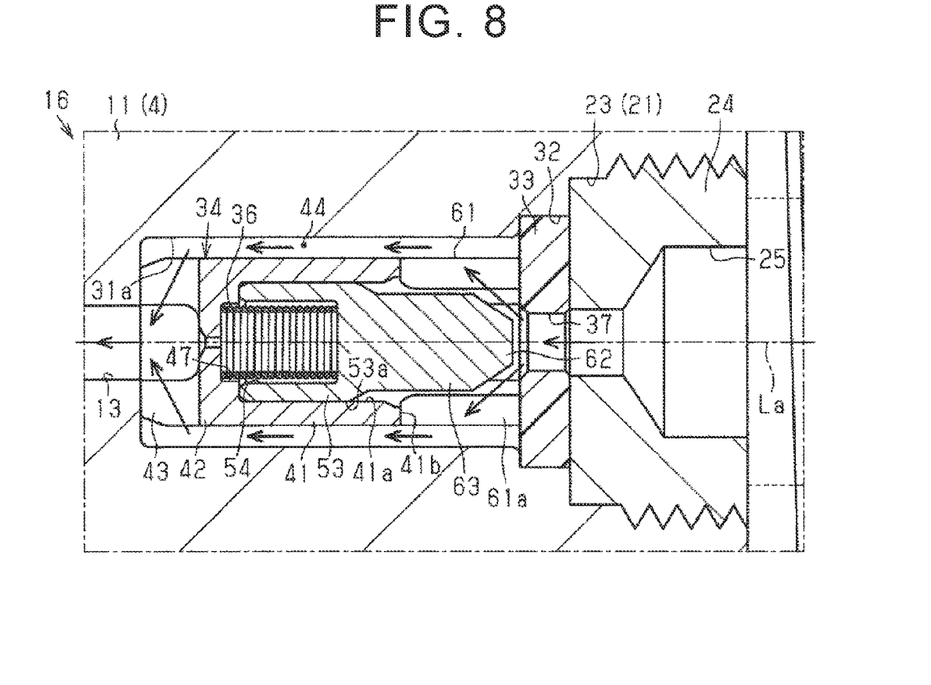
FIG. 8 is a partly-sectioned view near the check valve of the second embodiment in a valve-open state.
Figure 9:
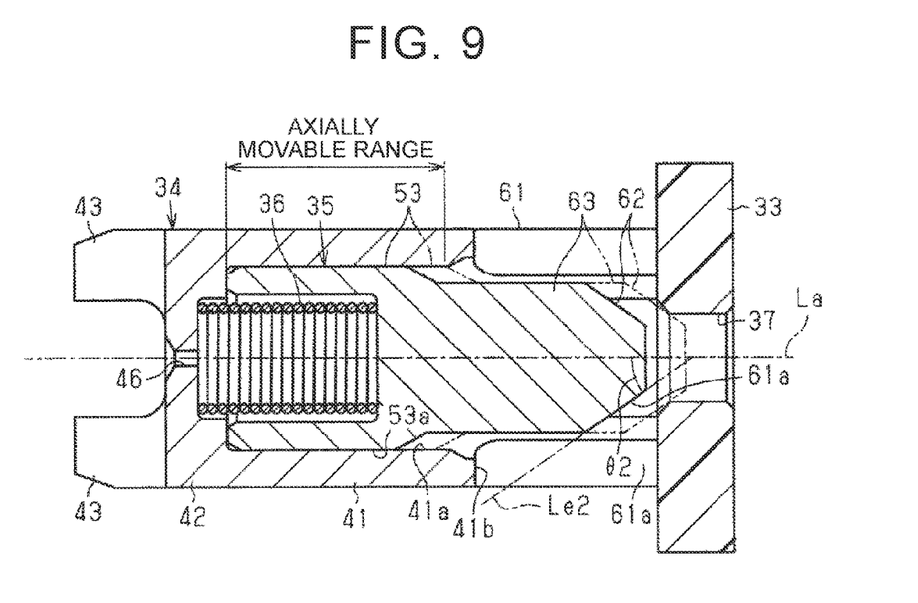
FIG. 9 is a schematic view showing a dimensional relationship between a case and a valve element of the second embodiment.

As illustrated in FIGS. 7 and 8, a lateral hole forming portion 61 is formed to have an axial length longer than that of the first embodiment above in a case 34 of the present embodiment, so that a lateral hole 61a is also formed to have a longer axial length. In a valve element 35, a head portion 62 capable of blocking a valve hole 37 is formed to have a large inclination angle, and a shaft portion 63 in a cylindrical shape is formed to have an axial length longer than that of the first embodiment above. Then, as illustrated in FIG. 9, an inclination angle $\theta 2$ from an axis La of a tapered surface 62a of the head portion 62 is formed such that an extension line Le2 of the tapered surface 62a passes closer to a valve seat 33 than an end edge of a cylindrical portion 41 on a valve seat 33 side when the valve element 35 is positioned farthest away from the valve seat 33.

Subsequently, an operation effect of the present embodiment will be described. The present embodiment achieves the following effect in addition to the operation effects (1) and (2) of the first embodiment above.

(4) The tapered surface 62a of the head portion 62 is formed such that the extension line Le2 of the tapered surface 62a passes closer to the valve seat 33 than the end edge of the cylindrical portion 41 on the valve seat 33 side when the valve element 35 is positioned at a return end that is farthest away from the valve seat 33. Thus, as illustrated in FIG. 8, hydrogen gas flowing into the injection passage 13 through the valve hole 37 collides with the head portion 62 of the valve element 35 to flow along the tapered surface 62a, and thus hardly collides with an inner peripheral surface 41a of the cylindrical portion 41 to flow into a space 44 on an outer peripheral side of the case 34. This enables a flow of the hydrogen gas to be smoothed, so that occurrence of a turbulent flow can be reduced, for example.

The embodiment above also can be practiced with the following aspect acquired by appropriately changing the embodiment above. In each of the embodiments above, while the leg portion 43 is formed in the shape of a triangle pole, and is formed at each of the corners in the outer bottom face of the bottom 42, besides this, the leg portion 43 can be appropriately changed in shape, number, placement, and the like as far as hydrogen gas can flow to the back side of the injection passage 13 through the space 44.

In each of the embodiments above, while the lateral holes 45a, 61a are formed to radially pass through the lateral hole forming portions 45, 61, respectively, and are formed in the shape of a substantially U-shape opening in the corresponding end faces thereof, besides this, the lateral holes 45a, 61a may be formed in the shape of a round hole radially passing through the lateral hole forming portions 45, 61, respectively, for example.

In each of the embodiments above, the valve element 35 may be configured such that the head portions 51, 62 extend directly to the corresponding sliding portions 53 without providing the shaft portions 52, 63. In each of the embodiments above, while the case 34 is configured such that its outer peripheral surface includes the curved surface 34a with a cross section in an arc shape having a curvature equal to that of the inner peripheral surface 31a of the first accommodation portion 31 (injection passage 13), besides this, the outer peripheral surface of the case 34 may be formed in the shape of a polygon without a curved surface, for example.

In each of the embodiments above, while the entire outer peripheral surface 53a of the sliding portion 53 is brought into contact with the inner peripheral surface 41a of the cylindrical portion 41, besides this, the outer peripheral surface 53a and the inner peripheral surface 41a may be formed to be different in cross-sectional shape to cause only a part of the outer peripheral surface 53a to be brought into contact with the inner peripheral surface 41a.

In each of the embodiments above, while a coil spring is used for the urging member 36, besides this, a disk spring, an elastic body, and the like may be available, for example. When the valve element 35 can be urged toward the valve seat 33 by pressure of hydrogen gas, no urging member may be provided.

In each of the embodiments above, while the valve device 1 is attached to the gas tank 2 in which hydrogen gas is stored, besides this, the valve device 1 may be attached to a gas tank in which gas other than hydrogen gas is stored. Subsequently, technical ideas that can be grasped from each of the embodiments above and other examples will be additionally described below along with their effects.

There is provided a valve device in which an inner peripheral surface of an injection passage is formed in a cylindrical shape, and an outer peripheral surface of a case includes a curved surface with a cross section in an arc shape having a curvature equal to that of an inner peripheral surface of the injection passage, and a flow channel surface in a noncircular shape, extending throughout an entire axial range of the case. According to the structure described above, when the case is inserted into the injection passage, the case can be easily fixed while a clearance is formed between the inner peripheral surface of the injection passage and the flow channel surface to allow gas to flow through the clearance.

What is claimed is:

1. A valve device for a gas tank, comprising:
a body that is provided in the gas tank in which high-pressure gas is stored, and in which a gas flow channel communicating between an inside and an outside of the gas tank is provided; and
a check valve provided in an injection passage in the gas flow channel, the injection passage being provided to inject gas into the gas tank, wherein
the check valve includes a valve seat fixed in the injection passage, a case in a bottomed cylindrical shape fixed in the injection passage while a space is provided between an inner peripheral surface of the injection passage and the case to enable gas to flow through the space, and a valve element accommodated in the case to be brought into contact with and to be away from the valve seat,
the case includes a cylindrical portion into which the valve element is fitted to be axially movable, and a bottom of the cylindrical portion, provided at an axial end of the cylindrical portion, opposite to the valve seat, defines a range where the valve element is axially movable,
the valve element includes a head portion that can block a valve hole of the valve seat, and a sliding portion that is formed so as to have a zone of contact with the cylindrical portion, the zone being uniform throughout the range where the sliding portion is axially movable,
an outer peripheral surface of the valve element tapers from a first end of the sliding portion toward the head portion, the sliding portion having an axial length extending from the first end to a second opposite end,
the axial length of the sliding portion is within the cylindrical portion throughout the range where the sliding portion is axially movable, and
the case includes a lateral hole forming portion that forms a plurality of lateral holes.

2. The valve device according to claim 1, wherein an entire outer peripheral surface of the sliding portion is configured to contact an inner peripheral surface of the cylindrical portion.

3. The valve device according to claim 1, wherein:
an outer peripheral surface of the head portion includes a tapered surface in a tapered shape tapered toward the valve seat; and
the tapered surface is formed such that an extension line of the tapered surface passes closer to the bottom of the cylindrical portion than an end edge of the cylindrical portion on a valve seat side when the valve element is positioned at a return end that is farthest away from the valve seat.

4. The valve device according to claim 1, wherein:
an outer peripheral surface of the head portion includes a tapered surface in a tapered shape tapered toward the valve seat; and
an extension line of the tapered surface passes closer to the valve seat than an end edge of the cylindrical portion on a valve seat side when the valve element is positioned at a return end that is farthest away from the valve seat.

5. The valve device according to claim 1, wherein:
the inner peripheral surface of the injection passage is formed in a cylindrical shape; and
an outer peripheral surface of the case includes a curved surface with a cross section in an arc shape having a curvature equal to that of the inner peripheral surface of the injection passage, and a flow channel surface in a noncircular shape, extending throughout an entire axial range of the case.

6. The valve device according to claim 1, wherein:
an axial length of the cylindrical portion is greater than or equal to a sum of the axial length of the sliding portion and an axial length of the range where the sliding portion is axially movable.

7. The valve device according to claim 1, wherein:
the head portion of the valve element is surrounded by the lateral hole forming portion.

8. The valve device according to claim 1, wherein:
the lateral hole forming portion and the plurality of lateral holes are configured to increase a pressure of the gas applied to the head portion of the valve element.

9. The valve device according to claim 1, wherein:
the plurality of lateral holes are configured to direct the gas flowing into the injection passage via the valve hole to the space between the case and the inner peripheral surface of the injection passage.

* * * * *